United States Patent [19]

Wagner

[11] Patent Number: 5,199,152
[45] Date of Patent: Apr. 6, 1993

[54] CAPTIVATING A FASTENER TO A WORKPIECE

[75] Inventor: David P. Wagner, Geneva, Ill.

[73] Assignee: Illinois Tool Works Inc., Glenview, Ill.

[21] Appl. No.: 826,573

[22] Filed: Jan. 27, 1992

Related U.S. Application Data

[62] Division of Ser. No. 735,873, Jul. 25, 1991, Pat. No. 5,154,559.

[51] Int. Cl.$^5$ .......................... B23P 11/00; B23P 11/02
[52] U.S. Cl. ........................................ 29/444; 29/451; 29/525
[58] Field of Search ................. 29/437, 444, 450, 451, 29/453, 525; 411/107, 133, 134, 337, 424, 999

[56] References Cited

U.S. PATENT DOCUMENTS 5,094,579 3/1992 Johnson .............................. 411/107

Primary Examiner—Timothy V. Eley
Assistant Examiner—Kenneth J. Hansen
Attorney, Agent, or Firm—Schwartz & Weinrieb

[57] ABSTRACT

A fastener and a workpiece assembly comprises a fastener composed of a relatively strong, inflexible material and having a shank portion. Wings are disposed upon the shank, and the workpiece has portions thereof composed of a relatively flexible, resilient material. An aperture having a predetermined diameter is located within each one of the workpiece portions. The wings define an outer diameter substantially greater than the diameter of each aperture. The wings are capable of swaging the apertures, thereby increasing the diameters thereof, so as to allow for passage of the wings therethrough. The relatively flexible, resilient material has sufficient elastic memory so that the diameter of each aperture will become smaller than the outer diameter defined by means of the wings after being swaged by means of the passage of the wings therethrough.

14 Claims, 1 Drawing Sheet

U.S. Patent  Apr. 6, 1993  5,199,152
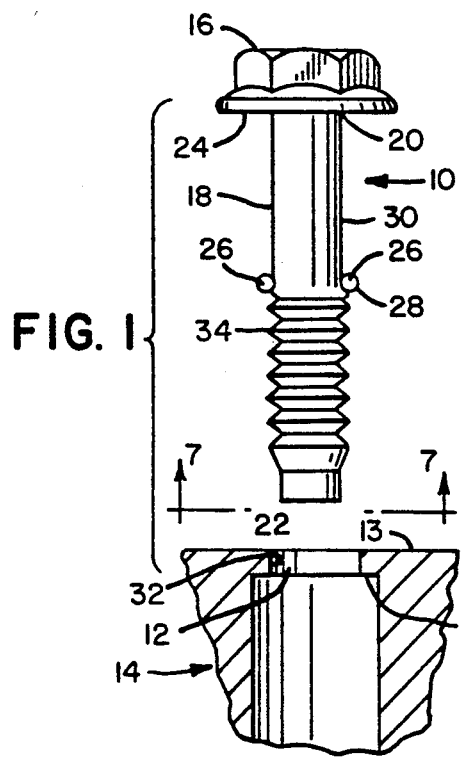
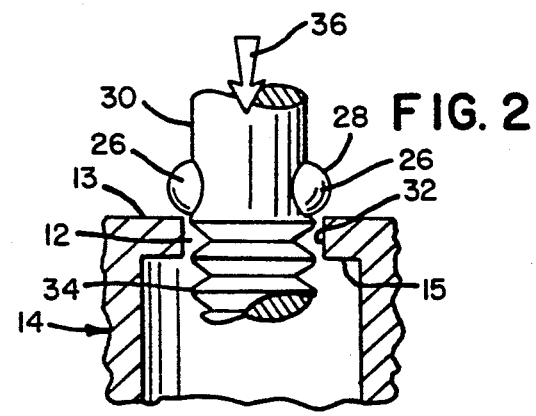
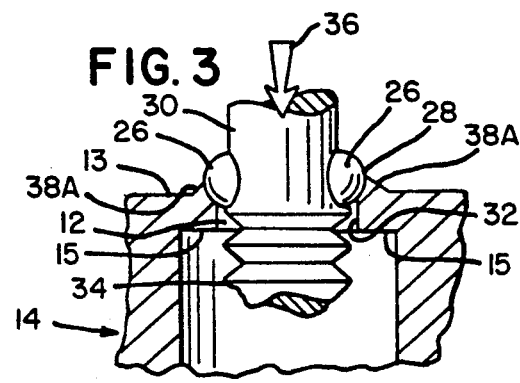
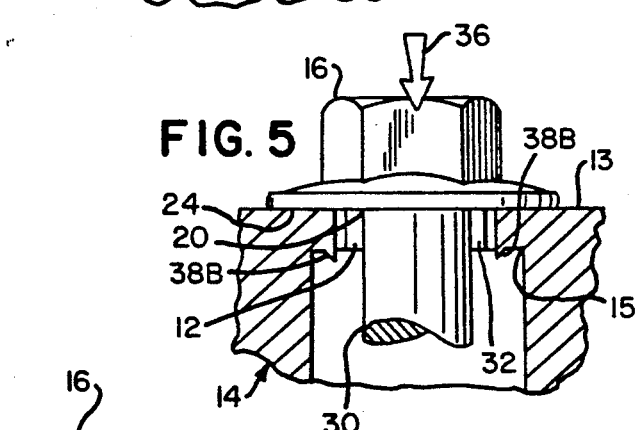
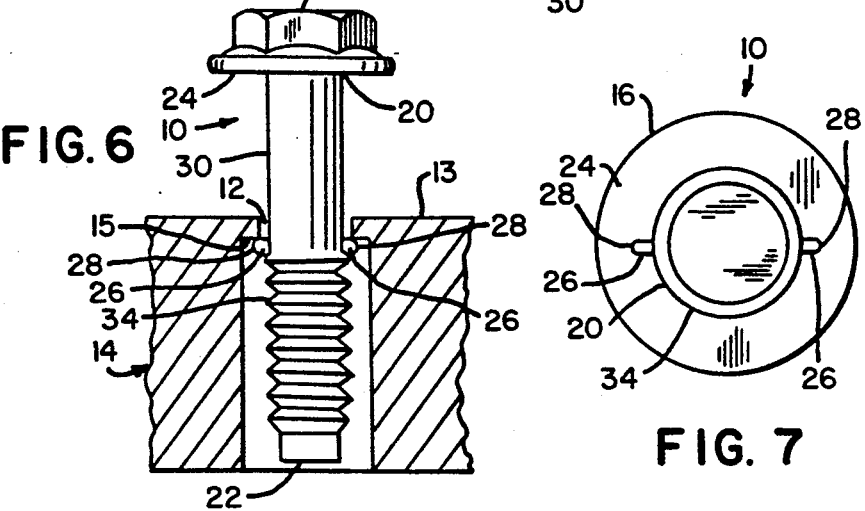
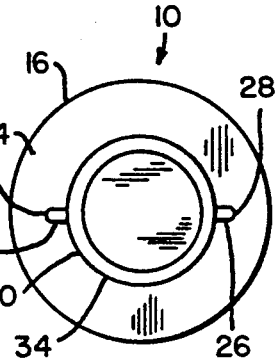

CAPTIVATING A FASTENER TO A WORKPIECE

This application is a division, of application Ser. No. 735,873, filed Jul. 25, 1991 now U.S. Pat. No. 5,154,559.

FIELD OF THE INVENTION

The present invention relates generally to a unique means for captivating a fastener within an aperture of a workpiece, and more specifically, the invention relates to a fastener having wings protruding outwardly from the shank of the fastener for providing an interfering connection with the workpiece.

BACKGROUND OF THE INVENTION

Means and constructions for slidably maintaining fasteners within a workpiece are well-known, as is evident, for example, from the following patents:

| Webster | 1,369,995 | 03/01/21 |
|---|---|---|
| Anderson | 1,927,780 | 09/19/33 |
| Sitzler | 2,010,569 | 08/06/35 |
| Currier, et al. | 3,209,806 | 10/05/65 |
| Tildesley | 3,727,254 | 04/17/73 |
| Menke | 4,396,327 | 08/02/83 |
| Jonsson | 4,655,656 | 04/07/87 |

These patents disclose generally the use of wings upon the shank of the fastener so as to retain it within its respective workpiece. Additionally, the patent of Ryner, U.S. Pat. No. 3,209,807, discloses an apparatus and a means for positively retaining a screw within a hole defined within a sheet of metal. The apparatus consists of a screw having a conical recess defined within a bottom end of the head and a bushing composed of a relatively soft metal. The bushing is inserted into the hole from a side opposite to the screw, and extends beyond the surface of the sheet towards the screw. As the screw is inserted into the bushing, the conical recess deforms a portion of the bushing, thereby retaining the screw. This means, however, is quite time consuming and labor intensive because an operator must be present upon both sides of the sheet so as to retain the screw properly.

Other costly and labor intensive means are evident in the patent of Acres, U.S. Pat. No. 2,987,811, and the patent of Gulistan, U.S. Pat. No. 4,655,658. Both of the means disclosed in these patents require the use of a tool to affect the captivation of the screw within an aperture defined within a workpiece.

The patent of Seely, U.S. Pat. No. 4,032,806, discloses another means for retaining screws. This means causes the threads upon the screw to cut through an aperture having a diameter substantially smaller than the corresponding diameter of the screw. This means may cause damage to the threads, and lead to an unsatisfactory, and possibly unsafe connection formed by means of the threaded components.

The patent of Hill, U.S. Pat. No. 4,557,653, discloses a snap-fit means for captivating a panel screw. While this means is relatively inexpensive, it is limited to application with a nonmetallic screw. While the nonmetallic composition of the screw may be of little consequence in some environments, it is critical in others, such as for example, attaching a manifold to an engine, and other environments which experience high temperatures or great stresses.

The patents of Wagner, U.S. Pat. No. 4,732,519 and 4,975,008, disclose further means for retaining a fastener within an aperture defined within a workpiece. In accordance with these means, wings protrude from the shank of the fastener which is inserted into an aperture having a sleeve associated therewith. In order to retain the fastener within the aperture, a rubber grommet and/or a washer are placed over the sleeve, thereby reducing the diameter defined thereby. These means are also time consuming and quite labor intensive, due to the above-discussed characteristics.

OBJECTS OF THE INVENTION

Accordingly, a new means for captivating a fastener within a workpiece is desired. Preferably, the new means would be less time consuming and less labor intensive than many of the means currently used in the art. The new means would allow for quick, easy insertion of the fastener into an aperture defined within the workpiece. The fastener would be retained firmly within the workpiece, but the fastener would be capable of both axial and rotational movement within the aperture of the workpiece. Additionally, the new means would not employ or require any additional elements other than the workpiece and the fastener.

A general object of the present invention is to provide a new means for captivating fasteners within an aperture defined within a workpiece.

A more specific object of the invention is to provide a fastener having wings projecting away from the shank of the fastener, thereby defining a diameter substantially greater than the diameter of the aperture defined within the workpiece within which the fastener is to be secured, so that the wings can swage the workpiece, thereby deforming the material of the workpiece so as to allow passage of the wings therethrough, and with the material of the workpiece being capable of returning towards its original condition for captivating the fastener.

Another object of the present invention is to provide a fastener composed of a relatively hard, inflexible material and a workpiece at least partially composed of a relatively flexible, resilient material having sufficient elastic memory so that the protuberances of the workpiece will return towards their original conditions without external assistance.

A further object of the present invention is to provide a fastener which is capable of being captivated within an aperture of a workpiece and which has diametrically opposed wings extending away from the shaft of the fastener.

An additional object of the present invention is to provide a means for captivating a fastener within a workpiece which allows the fastener to move axially and rotatably, or otherwise float within the aperture of the workpiece prior to final installation of the workpiece.

Another object of the present invention is to provide a means for captivating a fastener within a workpiece whereby the fastener is maintained in a pre-assembled disposition.

A further object of the present invention is to provide a fastener having wings extending away from the shank thereof and which retain the fastener inside a workpiece due to the interference defined between the wings and a surface portion of the workpiece defining the aperture.

An additional object of the present invention is to provide a pre-assembled fastener and an apertured workpiece having means for captivating the fastener within the workpiece and which does not require the employment of a grommet, washers, stampings and the like.

Another object of the present invention is to provide a fastener having means for captivating the fastener within an aperture defined within a workpiece wherein the fastener has diametrically opposed wings which are capable of forming a path through the margin of the aperture, and the material of the aperture has sufficient elastic memory so as to return to its original condition.

SUMMARY OF THE INVENTION

A fastener having means for captivating the fastener within an aperture defined within a workpiece and constructed according to the teachings of the present invention comprises a shank composed of a relatively strong, inflexible material. Wings or protuberances are disposed upon the shank for engagement with the workpiece which has sidewall portions thereof which define the aperture and which are composed of a relatively flexible, resilient material. The wings define an outer diameter substantially greater than the normal diameter of the aperture defined within the workpiece. The wings are capable of swaging marginal portions of the aperture to a predetermined extent so as to allow for passage of the wings therethrough. The relatively flexible, resilient material of the workpiece has sufficient elastic memory so that the swaged margin of the aperture can have a diametrical extent which is substantially smaller than the outer diameter defined by means of the wings after being swaged by the passage of the wings therethrough.

BRIEF DESCRIPTION OF THE DRAWINGS

The organization and manner of the structure and operation of the invention, together with further objects and advantages thereof, may best be understood by reference to the following description when taken in connection with the accompanying drawings, wherein like reference numerals identify like elements throughout the several view and wherein:

FIG. 1 is a partial sectional view of a fastener and a workpiece, constructed according to the teachings of the present invention, showing the construction thereof and the axial alignment of the fastener and the aperture prior to captivation of the fastener within the workpiece;

FIG. 2 is an enlarged fragmentary view of a fastener, constructed according to the teachings of the invention, and a workpiece showing the configurations thereof immediately prior to the insertion of the fastener into an aperture defined within the workpiece;

FIG. 3 is a partial sectional view, similar to that of FIG. 2, showing the wings of the fastener shank engaging the marginal surface of the workpiece disposed about the aperture and thereby swaging the material of the workpiece so as to form a path for the wings passing therethrough the and adjacent diametrical protuberances formed upon the workpiece;

FIG. 4 is a partial sectional view, similar to that of FIG. 3, showing the protuberances formed upon the workpiece proximate to the path of wing travel through the aperture;

FIG. 5 is a partial sectional view, similar to that of FIG. 4, showing the head of the fastener engaging the protuberances formed upon the exterior surface of the workpiece and thereby assisting the protuberances in returning towards their original condition;

FIG. 6 is a partial sectional view, similar to that of FIG. 1, showing, however the wings of the fastener shank engaging the marginal portion of the workpiece which defines the aperture thereof, from the interior of the workpiece and being retained thereby; and FIG. 7 is a view, taken along line 7—7 of FIG. 1, showing the construction and structural relationships the different elements of the fastener.

DETAILED DESCRIPTION OF THE PREFERRED EMBODIMENT

While the invention may be susceptible to embodiment in different forms, there is shown in the drawings, and will therefore be described herein in detail, a specific embodiment with the understanding that the present disclosure is to be considered an exemplification of the principles of the invention, and is not intended to limit the invention to that as illustrated and described herein.

Referring initially to FIG. 1 and FIG. 6, a fastener 10, constructed so as to be captivated within an aperture 12 defined within a workpiece 14 according to the teachings of the present invention, is illustrated. The workpiece 14 comprises a marginal or annular sidewall portion which defines aperture 12 and which has a first side 13 and a second side 15 with the aperture 12 providing communication between the first and second sides 13 and 15. Preferably, the aperture 12 is counterbored through the workpiece 14 so as to define the second side or internal shoulder 15.

The fastener 10 is composed of a relatively strong, inflexible material, such as, for example, steel and the like which may be hardened so that the fastener 10, as well as the elements thereof, will not deform or bend under the influence of forces attendant in captivating the fastener 10 within the aperture 12 formed within the workpiece 14, or under the influence of stresses and load forces attendant the function and operation of the workpiece 14. As will become more clear herein, it is important that the fastener 10 be constructed of a relatively strong, inflexible material, and that the workpiece 14, or at least the marginal or sidewall portions thereof defining the aperture 12, be constructed of a relatively resilient, flexible material having sufficient elastic memory, such as, for example, aluminum, zinc, some plastics, and the like.

The general construction of the fastener 10 is disclosed fully in FIG. 1 and FIG. 6. Specifically, the fastener 10 has a head 16 and a shank 18. The shank 18 has a first end 20 and a second end 22. The shank 18 is substantially cylindrical in shape, having a substantially circular cross section taken along a line perpendicular to an axis of elongation of the shank 18.

The head 16 is of known construction, having a substantially planar underside 24 opposing and connected to the first end 20 of the shank 18. The underside 24 of the head 16 is designed to confront and engage the first side 13 of the workpiece 14. The planar configuration of the underside 24 of the head 16 allows load forces impressed upon the fastener 10 to be evenly or uniformly distributed to a portion of the first side 13.

The head 16 itself may comprise a number of configurations, depending upon the desired application of the fastener 10. Accordingly, the head 16 may have a polygonal peripheral configuration, such as, for example, a hexagon, or may bear a polygonal aperture, a slot, or a plurality of slots. Any head configuration which facilitates application of a torque to the fastener 10 may be used without affecting the basic operating principles of the invention. The head 16 and the shank 18 have a common axis so that any torque applied to the head 16 will be axially transmitted to the shank 18.

Portions of the shank 18 are deformed so as to form projections thereon. Accordingly, the projections are composed of the same strong, inflexible material as the remainder of the fastener 10. Projections in the form of wings 26 are disposed upon the shank 18 between the first end 20 and the second end 22. The wings 26 extend a predetermined distance substantially perpendicularly or radially outwardly away from the surface of the shank 18. Preferably, the wings 26 are diametrically opposed upon the shank 18 along a diameter thereof. The wings 26 are disposed approximately midway between the first end 20 and the second end 22.

As shown in FIG. 7, the wings 26 define an outer diameter 28 which is greater than a corresponding diameter 30 of the shank 18 and a corresponding diameter 32 of the aperture 12. The diameter 30 of the shank 18 is less than the corresponding diameter 32 of the aperture 12. In this manner, the shank 18 is free to move axially and rotationally within the aperture 12. However, due to the larger size of the outer diameter 28 defined by means of the wings 26, the wings 26 cannot move freely through the aperture 12. Thus, the wings 26 must be forced through the aperture 12 in order to captivate the fastener 10. The wings 26 have a generally rounded surface, as shown clearly in FIG. 2 through FIG. 4. This is desirable so that the wings 26 can swage the workpiece 14 and not cut it, as will be discussed below, as the wings 26 are forced through the aperture 12.

The portion of the shank 18 defined between the first end 20 thereof and the wings 26 is substantially cylindrical. This construction allows the fastener 10 to captivatively float within the aperture 12. Threads 34 are disposed upon the shank 18 between the wings 26 and the second end 22. The threads 34 are capable of accepting a nut, not shown, or are constructed so as to mate with a complimentary threaded section which may be formed upon another workpiece, also not shown, to which the workpiece 14 is to be attached. Such a thread construction is well known in the relevant art.

The operation and utilization of the present invention will become more clear in the following paragraphs. The fastener 10 is formed from a relatively strong, inflexible material so as to have the above-disclosed construction. The workpiece 14 is formed, with respect to the fastener 10, from a relatively flexible, resilient material. The configuration of the workpiece 14 depends upon the particular employment in connection with which it is to be used. The workpiece 14 is provided with apertures 12 which accept fasteners 10 useful for mounting the workpiece 14 onto a machine or another workpiece.

In order to captivate the fasteners 10 within the apertures 12 defined within the workpiece 14, the fastener 10 is axially aligned with respect to the aperture 12, as shown in FIG. 1. Thus, the second end 22 of the fastener 10 directly opposes the first side 13 of the workpiece 14 and the aperture 12. An axial force 36, designated by means of the vertical arrow in FIG. 2 through FIG. 5, is applied to the fastener 10, thereby placing the shank 18 within the aperture 12.

Due to the relative sizes of the diameter 30 of the shank 18 and the diameter 32 of the aperture 12, this process proceeds uninhibited. As shown in FIG. 2, a portion of the shank 18 defined between the second end 22 and the wings 26 extends through the aperture 12 and extends beyond the second side 15 of the workpiece 14. The wings 26 now engage and confront the first side 13 of the workpiece 14 in close proximity to the aperture 12.

The confrontation between the wings 26 and the first side 13 of the workpiece halts further progress of the fastener 10 through the aperture 12. Accordingly, the magnitude of the axial force 36 must be increased if the fastener is to be completely inserted within the workpiece aperture. The axial force 36 now has sufficient magnitude to complete insertion of the fastener 10. Due to the relative inflexibility of the wings 26, they are capable of moving through the workpiece 14, which is relatively flexible or yieldable.

As shown in FIG. 3, the wings 26, due to their rounded surfaces, swage the margin of the aperture 12 at the first side of the workpiece 14 so as to cause material to move up, or bulge outwardly and away from the wings 26, thereby allowing passage of the wings 26 thereby or therethrough. As the first side 13 allows for the passage of the wings 26 thereby, the material comprising the first side 13 and displaced by means of such passage of the wings 26 forms protuberances 38A which extend upwardly.

As the application of the axial force 36 continues, the wings 26 progress through the aperture 12, swaging the material of the workpiece 14 as they go, until the wings 26 have passed through the aperture 12. As the wings 26 swage the aperture margin adjacent to the second side 15 of the workpiece 14, protuberances 38B are formed thereon which extend substantially away from the second side 15, as shown in FIG. 4, in much the same fashion as the protuberances 38A extend away from the first side 13.

Due to the elastic memory of the material comprising the workpiece 14, the protuberances 38A and 38B and the margin marginal or peripheral portion of the aperture 12 move back towards their original conditions as shown in FIG. 6. As the protuberances 38A and 38B and the aperture margin return towards their original conditions, the original relative relationships defined between the diameter 28 and the diameters 30 and 32 are substantially redefined. Thus, the fastener 10 is now captivated within the aperture 12.

Depending upon the magnitude of the axial force 36, the fastener 10 may "pop" through the aperture 12, and continue through the aperture 12 axially until the underside 24 of the head 16 engages the protuberances 38A, as shown in FIG. 5. This engagement assists the protuberances 38A in returning towards their original condition, and assures that the original relationships defined between the diameters 28, 30, and 32 are restored. This engagement can also occur as the fastener 10 is threadedly engaged within a threaded aperture defined within a machine or other workpiece.

In this manner, the fastener 10 is captivated within the aperture 12. While the captivation is secure, it does allow the fastener 10 to move axially, rotate, or otherwise float within the aperture 12. Thus, a slidable connection is provided between the fastener 10 and the workpiece 14. Therefore, the fasteners 10 are held in a pre-assembled condition within the apertures 12 of the workpiece 14. This allows for quick and easy assembly of a machine. In addition, the clearance defined between the apertures 12 and the fastener 10 assists in solving problems, such as, for example those caused by means of misalignment of fasteners 10 with respect to mounting holes which may be provided within the machinery.

Because the wings swage the material of the workpiece 14 and do not cut it substantially, the captivating means of the present invention does not require a grommet. Additionally, the present invention does not damage the workpiece 14 in any way. Use of the above-disclosed means does not require utilization of any special fastening or captivating tools, and can be executed effectively by means of a solitary workman.

In accordance with a practical example of the use of the invention, the workpiece 14 can be a valve cover having a plurality of apertures 12 for receiving captivated fasteners 10 for subsequent attachment of the valve cover to an engine block.

While a preferred embodiment of the present invention is shown and described, it is envisioned that those skilled in the art may devise various modifications of the present invention without departing from the spirit and scope of the invention which is defined by means of the appended claims. The invention is therefore not intended to be limited by means of the foregoing disclosure, but only by means of the following appended claims.

The invention claimed is:

1. A method of captivating a shank portion of a fastener within a workpiece, wherein said workpiece has an aperture having a predetermined diameter and is made from a deformable material having a predetermined degree of resiliency and a predetermined degree of elastic memory, comprising the steps of:
providing wing means upon said shank portion of said fastener, said wing means being composed of a relatively hard, non-deformable material as compared with said material of said workpiece, said wing means define an outer diameter which is greater than said predetermined diameter of said aperture of said workpiece, and said wing means have a rounded cross-sectional configuration;
inserting said shank portion of said fastener into said aperture of said workpiece until said wing means of said shank portion of said fastener engages a marginal portion of said workpiece which defines said aperture; and
applying a force to said fastener so as to cause said wing means of said shank portion of said fastener to be forced through said aperture of said workpiece and thereby swage said marginal portion of said workpiece defining said aperture, thereby increasing said diameter of said aperture of said workpiece to a predetermined degree which is sufficient to permit passage of said wing means of said shank portion of said fastener therethrough while permitting said swaged marginal portion of said workpiece to return towards its original position and condition in accordance with said predetermined resiliency and elastic memory properties thereof so that said aperture of said workpiece substantially achieves its original diametrical dimension so as to retain said fastener at a pre-assembled position within said workpiece after passage of said wing means of said shank portion of said fastener through said aperture of said workpiece.

2. A method as set forth in claim 1, wherein:
said wing means are provided upon diametrically opposite portions of said shank portion of said fastener.

3. A method as set forth in claim 1, wherein:
said wing means are fabricated from steel.

4. A method as set forth in claim 1, wherein:
said workpiece is fabricated from a material selected from a group of materials consisting of aluminum, zinc, magnesium, and plastics having elastic memory.

5. A method as set forth in claim 1, wherein:
said predetermined diameter of said aperture of said workpiece is formed so as to have a diametrical dimension which is greater than the diametrical extent of said shank portion of said fastener so as to thereby allow said fastener to float within said aperture of said workpiece after passage of said wing means of said shank portion of said fastener through said aperture of said workpiece.

6. A method as set forth in claim 1, wherein:
said fastener is provided with a head portion integrally formed with one end of said shank portion;
said swaging of said marginal portion of said workpiece defining said aperture results in the formation of protuberance portions within said marginal portion of said workpiece defining said aperture; and
said shank portion of said fastener is forced through said aperture of said workpiece with sufficient force so as to cause said head portion of said fastener to engage said protuberance portions of said marginal portion of said workpiece defining said aperture and thereby assist said swaged marginal portion of said workpiece to return towards said original position and condition.

7. A method as set forth in claim 6, wherein:
said shank portion of said fastener is provided with a threaded portion which is axially spaced from said one end upon which said head portion is formed; and
said threaded shank portion of said fastener is threadedly engaged within a threaded bore of said workpiece so as to cause said head portion of said fastener to engage said protuberance portions of said marginal portion of said workpiece defining said aperture and thereby assist said swaged marginal portion of said workpiece to return towards said original position and condition.

8. A method of forming an assembly wherein a fastener is captivated within a workpiece, comprising the steps of:
fabricating a workpiece from a deformable material having a predetermined degree of resiliency and a predetermined degree of elastic memory;
defining an aperture within said workpiece such that said aperture has a predetermined diameter;
fabricating a fastener, having a shank portion and wing means formed upon said shank portion of said fastener, from a relatively hard, non-deformable material as compared with said material of said workpiece, said wing means defining an outer diameter which is greater than said predetermined diameter of said aperture of said workpiece, and said wing means have a rounded cross-sectional configuration;
inserting said shank portion of said fastener into said aperture of said workpiece until said wing means of said shank portion of said fastener engages a marginal portion of said workpiece which defines said aperture; and
applying a force to said fastener so as to cause said wing means of said shank portion of said fastener to be forced through said aperture of said workpiece and thereby swage said marginal portion of said workpiece defining said aperture, thereby increasing said diameter of said aperture of said workpiece to a predetermined degree which is sufficient to permit passage of said wing means of said shank portion of said fastener therethrough while permitting said swaged marginal portion of said workpiece to return towards its original position and condition in accordance with said predetermined resiliency and elastic memory properties thereof so that said aperture of said workpiece substantially achieves its original diametrical dimension, which is smaller than said outer diameter of said wing means of said shank portion of said fastener, so as to retain said fastener at a pre-assembled position within said workpiece after passage of said wing means of said shank portion of said fastener through said aperture of said workpiece as a result of engagement of said wing means directly with said marginal portion of said workpiece defining said aperture within said workpiece.

9. A method as set forth in claim 8, wherein:
said wing means are provided upon diametrically opposite portions of said shank portion of said fastener.

10. A method as set forth in claim 8, wherein:
said fastener and said wing means thereof are fabricated from steel.

11. A method as set forth in claim 8, wherein:
said workpiece is fabricated from a material selected from the group of materials consisting of zinc, aluminum, magnesium, and plastics having elastic memory.

12. A method as set forth in claim 8, wherein:
said predetermined diameter of said aperture of said workpiece is formed so as to have a diametrical dimension which is greater than the diametrical extent of said shank portion of said fastener so as to thereby permit said fastener to float within said aperture of said workpiece after passage of said wing means of said shank portion of said fastener through said aperture of said workpiece.

13. A method as set forth in claim 8, wherein:
said fastener is provided with a head portion integrally formed with one end of said shank portion;
said swaging of said marginal portion of said workpiece defining said aperture results in the formation of protuberance portions within said marginal portion of said workpiece defining said aperture; and
said shank portion of said fastener is forced through said aperture of said workpiece with sufficient force so as to cause said head portion of said fastener to engage said protuberance portions of said marginal portion of said workpiece defining said aperture and thereby assist said swaged marginal portion of said workpiece to return towards said original position and condition.

14. A method as set forth in claim 13, wherein:
said shank portion of said fastener is provided with a threaded portion which is axially spaced from said one end upon which said head portion is formed; and
said threaded shank portion of said fastener is threadedly engaged within a threaded bore of said workpiece so as to cause said head portion of said fastener to engage said protuberance portions of said marginal portion of said workpiece defining said aperture and thereby assist said swaged marginal portion of said workpiece to return towards said original position and condition.

* * * * *